(12) United States Patent
Shinji et al.

(10) Patent No.: US 9,557,425 B2
(45) Date of Patent: Jan. 31, 2017

(54) CABLE AND RADIATION MEASUREMENT APPARATUS

(71) Applicant: Kuraray Co., Ltd., Kurashiki-shi (JP)

(72) Inventors: Osamu Shinji, Tainai (JP); Tatsuya Ueda, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/401,412

(22) PCT Filed: May 22, 2013

(86) PCT No.: PCT/JP2013/064211
§ 371 (c)(1),
(2) Date: Nov. 14, 2014

(87) PCT Pub. No.: WO2013/179970
PCT Pub. Date: Dec. 5, 2013

(65) Prior Publication Data
US 2015/0131937 A1  May 14, 2015

(30) Foreign Application Priority Data
May 31, 2012 (JP) ................................ 2012-124412

(51) Int. Cl.
*G02B 6/00* (2006.01)
*G01T 1/20* (2006.01)
*G01T 1/10* (2006.01)

(52) U.S. Cl.
CPC *G01T 1/201* (2013.01); *G01T 1/10* (2013.01)

(58) Field of Classification Search
USPC .......................................................... 385/12
See application file for complete search history.

(56) References Cited

U.S. PATENT DOCUMENTS

| 4,575,184 A * | 3/1986 | Ueno .................... G02B 6/4416 |
| | | 106/18.11 |
| 5,780,856 A | 7/1998 | Oka et al. |
| 6,671,451 B1 * | 12/2003 | Sugihara .................... G01T 1/20 |
| | | 385/12 |
| 2013/0001424 A1* | 1/2013 | Kusner ...................... G01T 3/06 |
| | | 250/362 |
| 2015/0138823 A1* | 5/2015 | Corrigan ................ G01D 5/268 |
| | | 362/551 |

FOREIGN PATENT DOCUMENTS

| JP | 54 12882 | 1/1979 |
| JP | 3 92789 | 4/1991 |

(Continued)

OTHER PUBLICATIONS

Machine translation of JP09-127246.*

(Continued)

*Primary Examiner* — Sung Pak
(74) *Attorney, Agent, or Firm* — Oblon, McClelland, Maier & Neustadt, L.L.P.

(57) ABSTRACT

A cable with a scintillation fiber having high radiation detecting accuracy is provided. The cable comprise a protective tube, a scintillation fiber accommodated in the protective tube, and a light emission preventing element accommodated in the protective tube.

14 Claims, 11 Drawing Sheets

(56) References Cited

FOREIGN PATENT DOCUMENTS

| JP | 5 249247 | 9/1993 |
| JP | 7-311269 | 11/1995 |
| JP | 9 15335 | 1/1997 |
| JP | 9 127246 | 5/1997 |
| JP | 9 304536 | 11/1997 |
| JP | 10 186034 | 7/1998 |

OTHER PUBLICATIONS

International Search Report Issued Aug. 20, 2013 in PCT/JP13/064211 Filed May 22, 2013.
Office Action issued Oct. 26, 2016, in corresponding Japanese Patent Application No. 2014-518404, (with English-language language Translation).

* cited by examiner

CABLE AND RADIATION MEASUREMENT APPARATUS

TECHNICAL FIELD

The present invention relates to a radiation measurement apparatus.

BACKGROUND ART

FIG. 8 is a schematic drawing illustrating a radiation detector that uses a scintillation fiber. In FIG. 8, 1 denotes radial rays. 2a and 2b denote light pulses derived from fluorescence. 3 denotes a cable including a scintillation fiber. 4a and 4b denote light receiving elements coupled to the scintillation fiber 3. 5a and 5b denote head amplifiers. 6a and 6b denote constant fraction discriminators (pulse height discriminators). 7 denotes a signal delay circuit. 8 denotes a time-to-pulse height converter. 9 denotes an analog-to-digital converter. 10 denotes a multichannel pulse height analyzer (radiation analyzer). Operations thereof will be described below. When the radial rays 1 enter into the scintillation fiber 3, fluorescence is generated within the scintillation fiber 3. As a result thereof, the light pulses 2a and 2b propagate to the respective ends of the scintillation fiber 3. The light receiving elements 4a and 4b convert the received light pulses 2a and 2b to electric pulse signals, respectively. The electric pulse signals are input into the time-to-pulse height converter 8 via the constant fraction discriminators 6a and 6b and the signal delay circuit 7. An electrical pulse having a pulse height in proportion to a time lag between arrival timing to the light receiving element 4a and arrival timing to the light receiving element 4b is output from the time-to-pulse height converter 8. The output pulse is input into the analog-to-digital converter 9. The multichannel pulse height analyzer 10 discriminates the pulses for each pulse height to count them. This makes out a position of incidence of the radial rays 1. The count number makes out a radiation dose rate. In the above description, coupling of the light receiving elements 4a and 4b to the respective ends of the scintillation fiber 3 makes out the position of incidence of the radial rays 1. This is referred to as the Time of Flight (TOF) method (method for measuring time lag in flight). This is a typical radiation dose measuring method listed in the following citation list. Only one light receiving element is sufficient for measuring the only radiation dose rate.

A plastic scintillation fiber (PSF) is known as the scintillation fiber 3. The PSF is a plastic fiber including a plastic scintillator (core) clad in a low refractive index polymer. The core is typically configured such that an organic fluorescent substance is dissolved in an organic polymer (e.g., polystyrene and polyvinyl toluene) having an aromatic ring. The low refractive index polymer is, for example, polymethyl methacrylate or fluorine-containing polymethyl methacrylate. The PSF is employable for the use of the radiation measurement. A principle of the radiation measurement using the PSF is as follows. When the radial rays (e.g., high energy electromagnetic waves such as X-rays and γ-rays; neutron rays; electron rays (β-rays); charged particle radiation such as protons) are radiated to the core, ultraviolet rays are emitted from the high polymer of the aromatic ring as a core material. As a result thereof, the contained organic fluorescent substance induces absorption of ultraviolet radiation and wavelength conversion to a long wavelength. More specifically, the contained organic fluorescent substance induces conversion to a blue color that represents the maximum sensitivity of a photomultiplier tube. The blue color light propagates through the core to reach each of the light receiving elements where it is detected.

FIG. 9 is a schematic drawing illustrating a luminescence principle by irradiation of the radial rays to the PSF. When the radial rays cross the PSF, the poly styrene (PS) constituting the core emits ultraviolet radiation having a wavelength around 300 nm. The core made of the PS contains, for example, two different kinds of fluorescent agents (e.g., a primary fluorescent agent and a secondary fluorescent agent) (see, FIG. 10). The ultraviolet radiation is converted into light having a wavelength of around 350 nm by the primary fluorescent agent, and the light having the wavelength around 350 nm is further converted into visible blue color light having a wavelength around 430 nm by the secondary fluorescent agent. At a position within a range of several mm from the position at which the radial rays entered, the wavelength conversion from the ultraviolet radiation having the wavelength of around 350 nm to the visible blue color light having the wavelength of around 430 nm completes (see, FIG. 9). The visible blue color light partially propagates in a longitudinal direction of the PSF to the respective sides of the PSF. The light receiving elements (e.g., photomultiplier tube and PMT) that received the visible blue color light output electric signal pulses. Intensities of the visible blue color light reaching the ends of the PSF are normally weak, i.e., are a level within a range between several photons and several tens of photons (light quantum). FIG. 11 illustrates an example of the radiation detection assembly having a simplest structure using the PSF. When the radial rays 1 cross the PSF cable 3, many photons having a blue color wavelength are generated through the core of the PSF. The light pulse 2 of a portion thereof propagates to the right (rightward in FIG. 11) within the PSF. The blue light of the range between several photons and several tens of photons reaches a photomultiplier tube coupled to a right end face of the PSF as the light pulse 2 having a time width of several nanoseconds. The radial rays cross the PSF cable 3 at random times. Therefore, the light receiving elements (e.g., photomultiplier tubes) 4 output electric pulse signals at random times. The electric pulse signals are amplified by the head amplifiers 5. The constant fraction discriminators (pulse height discriminators) 6 convert only signals of a level higher than the noise level into rectangular pulses. A multichannel scaler 11 counts the number of the rectangular pulse signals per unit time to measure the radiation intensity thereof. In a lower part of FIG. 11, changes of signals are schematically illustrated with the horizontal axis being time and the vertical axis being signal strength. The changes of signals are illustrated in the order that the radial rays are entered into the PSF, the radial rays are converted into the optical pulse signals, thus obtained optical pulse signals are further converted into the electric pulse signals, and the resulting signals are finally counted.

In a case where the photomultiplier tube is employed as the light receiving element, it is desirable to use the blue color light-emitting scintillation fiber. In a case where silicon photo diode is used as the light receiving element, since the silicon photo diode is more sensitive to a longer wavelength, it is desirable to use a green color light-emitting scintillation fiber having a wavelength of around 500 nm, more desirably, a red color light-emitting scintillation fiber having a wavelength of around 600 nm. To achieve this, various kinds of scintillation fibers made by appropriately selecting kinds and combinations of phosphors to be dissolved in the polystyrene are used.

To enhance measurement sensitivity, it is possible to use the PSF having a diameter of a range between 2 and 5 mm.

In a case where the PSF having a length beyond three meters up to several tens meters is used, it is essential for the PSF cable to have flexibility for the sake of accommodation of the PSF cable and measurement with the PSF cable being bent. In consideration of the measurement sensitivity and the flexibility of the PSF, a cable having a configuration that a plurality of PSFs each having a diameter less than 2 mm is bundled to be accommodated in the protective tube is proposed. In the above situation, to enhance the flexibility of the cable, it is preferable that the protective tube and the PSF are not tightly coupled to each other, i.e., are not formed into one piece, but are only assembled loosely. Further, it is preferable that the plurality of PSFs is not bound into one body but is restricted loosely. It is preferable that the plurality of PSFs is simply accommodated in the protective tube spaced constantly one another.

CITATION LIST

Patent Literature

[Patent Literature 1]
Japanese Unexamined Patent Application, First Publication No. Hei 05-249247
[Patent Literature 2]
Japanese Unexamined Patent Application, First Publication No. Hei 09-304536
[Patent Literature 3]
Japanese Unexamined Patent Application, First Publication No. Hei 10-186034

SUMMARY OF INVENTION

Technical Problem

In the above radiation detector, the inventors found noise was generated due to vibration and friction of a cable. It seems unlikely that a detection signal was derived from radial rays entered from the outside. Therefore, the inventors considered that the detection signal was noise.

At first, it was totally unknown from where the noise derived. The inventors seriously studied about this phenomenon. As a result, the inventors found that the noise was generated when the cable was bent and/or when vibration was applied to the cable. That is, when a bending force and/or vibration are applied to the cable, friction is produced between scintillation fibers and/or between a scintillation fiber and a protective tube. Static electricity is produced due to the friction. The static electricity causes, for example, ultraviolet rays to generate near the outside of the scintillation fiber. As a result thereof, phosphor that is dissolved in a core of the scintillation fiber is activated to emit light. Meanwhile, when the scintillation fiber is enclosed by a polyethylene film to produce friction therebetween, the scintillation fiber is positively charged, whereas, the polyethylene film is negatively charged. When friction is produced similarly in a dark room, a pulse signal was observed from the photomultiplier tube that was coupled to an end face of the scintillation fiber. Therefore, it was supposed that the above assumption was correct. Detachment of, for example, an adhesive tape produces electrical charge due to friction and/or contact between the adhesive tape and an adherent surface. This produces electrical discharge. Generation of electromagnetic radiation having a wavelength of a wide range, the range including radio wave, ultraviolet rays, visible light, and X-rays, is well known as a triboluminescence (friction to light-emission) phenomenon.

The vibration of the cable induced generation of quasi signal noise that was identical to the quasi signal noise observed when the radial rays were irradiated. The vibration and the like is unavoidable when measurement is performed indoor or outdoor, for example, in a case where the measurement is performed for the purpose of movement and in a case where the measurement is performed while the cable is loaded on, for example, vehicles to be moved. Specifically, such a situation invites a remarkable inconvenience. For example, measurement accuracy is deteriorated, and reliability of measurement is degraded.

Therefore, the problem to be solved by the present invention is to provide a technology excellent in preventing noise due to vibration from being generated and excellent in detection accuracy for detecting radial rays.

Solution to Problem

The problem is solved by a cable including
a protective tube,
a scintillation fiber accommodated in the protective tube, and
a light emission preventing device accommodated in the protective tube.

Alternatively, the problem is solved by a cable including
a protective tube,
a scintillation fiber accommodated in the protective tube, and
a light emission preventing member accommodated in the protective tube.

The problem is solved by a cable including
a protective tube,
a scintillation fiber accommodated in the protective tube, and
a light emission preventing element accommodated in the protective tube.

Alternatively, the problem is solved by a cable including
a protective tube,
a scintillation fiber accommodated in the protective tube, and
a light emission preventing member accommodated in the protective tube.

In the cable, the light emission preventing element accommodated in the protective tube is, for example, an antistatic element provided between the protective tube and the scintillation fiber.

The antistatic element is, for example, a friction reducing element. The friction reducing element is, for example, a friction reducing member. The friction reducing element (friction reducing member) is, for example, a lubricant. The lubricant is a lubricant filled in the protective tube. Alternatively, the lubricant is a lubricant provided on a surface of the fiber. The lubricant is, for example, an oil. Any kind of oil may be employed as the oil. For example, a silicone oil is employed. For example, a fluorine-based oil is employed.

The antistatic element is, for example, a conductive element. The conductive element is, for example, a conductive member (conductive material). For example, the conductive element is a conductive member (conductive material) for guiding an electrical charge to another part other than the scintillation fiber. The conductive element (conductive member) is a conductive film provided on the surface of the scintillation fiber. The conductive element (conductive member) is water or a solution containing an electrolyte composition (or a surfactant). For example, the conductive element (conductive member) is water or an ionic aqueous solution filled in the protective tube.

The antistatic element (e.g., conductive member (conductive material)) is also achieved by appropriately selecting a constituting material of an inner surface of the protective tube and a constituting material of an outer surface of the scintillation fiber. A material is selected such that a gap in triboelectric series between the constituting material of the inner surface and the constituting material of the outer surface becomes small. For example, if a position of the triboelectric series of the constituting material of the inner surface of the protective tube and a position of the triboelectric series of the constituting material of the outer surface of the scintillation fiber were the same, the static electricity is hardly produced even if the friction is generated therebetween.

The problem is solved by a cable including
a protective tube,
a scintillation fiber accommodated in the protective tube, and
a light entry preventing element for preventing light from entering into the scintillation fiber.

Alternatively, the problem is solved by a cable including
a protective tube,
a scintillation fiber accommodated in the protective tube, and
a light entry preventing member for preventing light from entering into the scintillation fiber.

The problem is solved by a cable including
a protective tube,
a scintillation fiber accommodated in the protective tube, and
a light entry preventing element for preventing light generated within the protective tube from entering into the scintillation fiber.

Alternatively, the problem is solved by a cable including
a protective tube,
a scintillation fiber accommodated in the protective tube, and
a light entry preventing member for preventing light generated within the protective tube from entering into the scintillation fiber.

The light entry preventing element is, for example, a light entry preventing member. For example, the light entry preventing element (light entry preventing member) is a black film provided on the surface of the scintillation fiber. Alternatively, the light entry preventing element (light entry preventing member) is a reflecting film provided on the surface of the scintillation fiber.

The scintillation fiber is, for example, a plastic scintillation fiber.

Preferably, more than one scintillation fibers (a plurality of scintillation fibers) are accommodated in the protective tube.

The problem is solved by a radiation measurement apparatus including the above described cable.

Advantageous Effect of Invention

The present invention is capable of realizing high detection accuracy in detecting radial rays.

DESCRIPTION OF EMBODIMENTS

Figure 1:
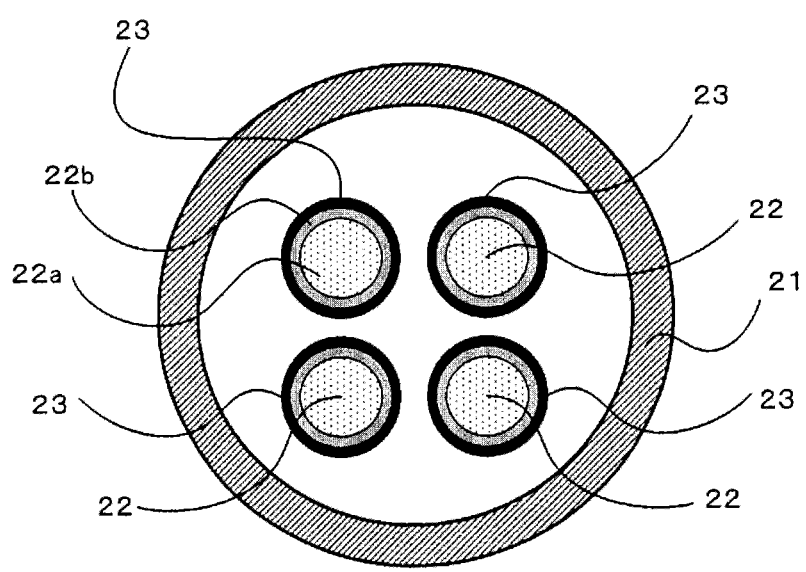
FIG. 1 is a cross sectional view of a cable according to a first embodiment of the present invention.

Embodiments of the present invention will be described below. A first invention is directed to a cable. The cable is a cable, specifically, for the use of radiation detection assembly. The cable includes a protective tube. The cable includes a scintillation fiber (specifically, a PSF). The scintillation fiber is accommodated in the protective tube. The number of scintillation fibers may be one. However, the preferable number of scintillation fibers is more than one. An upper limit of the number of scintillation fibers is decided according to an outer diameter of the scintillation fiber and an inner diameter of the protective tube. The cable includes a light emission preventing element. The light emission preventing element is accommodated in the protective tube. The light emission preventing element is, for example, a light emission preventing member.

The light emission preventing element is, for example, an antistatic element provided between the protective tube and the scintillation fiber. The antistatic element is, for example, an antistatic member.

The antistatic element is, for example, a friction reducing element. The friction reducing element is, for example, a friction reducing member. The friction reducing member is, for example, a lubricant. The lubricant is a lubricant filled in the protective tube. The lubricant is a lubricant lubricated over a surface of the scintillation fiber (specifically, the PSF). The lubricant is, for example, an oil. Examples of the oil include silicone oils such as dimethylpolysiloxane (dimethyl silicone oil), methylphenyl silicone oil, ester-modified methylhydrogensilicone, and fluorine-modified methylhydrogensilicone methylhydrogensilicon; chlorosilane-based oils; alkoxysilane-based oils; and fluorine-based oils such as chlorotrifluoroethylene. The oil is, for example, a silicone oil. The oil is, for example, fluorine-based oils.

In a case where the oil, as the friction reducing element (e.g., friction reducing member), was coated on the scintillation fiber, because of an handling ability thereof, a preferable kinetic viscosity (JIS K 2283, 25° C.) of the oil was within a range between 30 and 3000 mm$^2$/s. More preferable kinetic viscosity of the oil was within a range between 100 and 1000 mm$^2$/s. Further preferable kinetic viscosity of the oil was within a range between 200 and 500 mm$^2$/s. A coating method thereof will be exemplified below. Initially, a soft flannel cloth or the like is soaked in the oil. The scintillation fiber is covered with the cloth. Then the fiber is moved together with the covering cloth. With the method, it is possible to perform oil coating on line. There was such a tendency that the kinetic viscosity of the oil beyond 3000 mm$^2$/s or the kinetic viscosity of the oil below 30 mm$^2$/s generated coating unevenness.

A preferable thickness of the oil to be coated on the surface of the scintillation fiber was within a range between 0.1 and 300 nm. More preferable thickness of the oil was within a range between 0.3 and 10 nm. A thickness of less than 0.1 nm could not produce a sufficient friction reducing effect. A thickness beyond 300 nm poses a problem in handling the oil. For example, the problem is dripping of the oil. The preferable thickness of the oil is detected in a manner as described below. For example, in a case of using a silicone oil, the scintillation fiber, coated with the silicone oil and having a length of 1 to 10 m, is cleaned with hexane. The cleaning solution is condensed. Absorption of methyl group of the silicone oil in the condensed solution is measured by a nuclear magnetic resonance spectrometry (H-NMR method). Japanese Unexamined Patent Application, First Publication No. 2006-312131 discloses details of this measurement method.

The antistatic element is, for example, a conductive element. The conductive element contributes to prevention of electrical charge from being localized at a local area of the members, e.g., the scintillation fiber and the protective tube, within the cable. The conductive element is, for example, a conductive member (conductive material). The conductive element is a conductive film provided on the surface of the scintillation fiber. For example, the conductive film is a conductive coating film formed by coating a conductive powder (e.g., metal powder, carbon black, carbon nanotube) containing coating. Employment of the coating method, although not limitative, is more cost saving than employment of a deposition method. The conductive element (e.g., conductive member) is water (but not purified water). Preferably, the water is a solution containing a conductive component. For example, the conductive element (conductive member (conductive material)) is made by filling the protective tube with the solution containing the water conductive component. The conductive element (conductive member (conductive material)) is also made in a manner that the protective tube is filled with the purified water, and, subsequently, a conductive component that was separately filled in the protective tube is dissolved therein. The conductive component contained in the solution is, for example, an electrolyte composition. Alternatively, the conductive component contained in the solution is, for example, an ionic surfactant.

A preferable electrically charging performance is delivered when a post-treatment surface electrical resistance (JIS K 6911) is preferably a value equal to or less than $10^{12}\Omega$. More specifically, the preferable electrically charging performance is delivered when a post-treatment surface electrical resistance (JIS K 6911) is a value equal to or less than $10^8\Omega$. It is difficult to directly measure conductivities of the scintillation fiber and an inner wall of the protective tube. Therefore, it is difficult to evaluate the conductivities thereof. However, it becomes possible to make an evaluation by using a material that is identical to the above material, i.e., by using a material of which surface was subjected to the conductive treatment identical to that provided to the above material.

The antistatic element (e.g., antistatic member) is also achieved by appropriately selecting the constituting material of the inner surface of the protective tube and the constituting material of the outer surface of the scintillation fiber. The material is selected in a manner that the gap in triboelectric series between the constituting material of the inner surface and the constituting material of the outer surface becomes small. Preferable antistatic element is made by using the same kind of (identical) constituting materials. For example, if a position of the triboelectric series of the constituting material of the inner surface of the protective tube and a position of the triboelectric series of the constituting material of the outer surface of the scintillation fiber were the same, the static electricity is hardly produced even if the friction is generated therebetween. Here, in a case where the constituting materials show 50 wt % or more equivalence therebetween, the constituting materials are considered as the same kind of materials. For example, if the uppermost surface of the scintillation fiber is made of a high polymer material as a copolymer containing 90 wt % or more polymethyl methacrylate or a high polymer material as a copolymer containing 90 wt % or more structural unit derived from methyl methacrylate monomer, and if the inner surface of the protective tube is a layer made of a compound containing 60 wt % polymethyl methacrylate, it is considered that the constituting materials thereof are made of the same kind of material. If the scintillation fiber is covered with a high polymer material containing 70 wt % polyethylene having 0.5 mm thickness, and if the protective tube contains 90 wt % polyethylene, it is also considered that the constituting materials thereof are made of the same kind of material.

It is possible to employ the light entry preventing element instead of the light emission preventing element. The light entry preventing element is, for example, a light entry preventing member. If light is generated within the protective tube, the light entry preventing member serves to prevent the light from entering into the scintillation fiber. The light entry preventing member is, for example, a black film provided on the surface of the scintillation fiber. Examples of the black film include a carbon black-containing coating film and a coating film containing light absorbing colorant dissolved therein. As the black coating, it is possible to use aqueous coatings which do not damage the scintillation fiber as a black coating agent. The black coating has a film thickness of a range between 5 and 20 μm. The film thickness may be any thickness in so far as the thickness can prevent the ultraviolet rays from entering into the scintillation fiber. Any one of a spraying method, a continuous dipping method, and a die method is employed as the coating method, as required. An example of another black coating method includes a method for covering the scintillation fiber with black polyethylene by extruding the black polyethylene having a thickness of about 0.5 mm.

The light entry preventing member is, for example, a reflecting film provided on the surface of the scintillation fiber. As an example of the reflecting film, it is possible to coat the surface of the scintillation fiber with a metal film such as an Al deposited film and an Ag deposited film to a thickness of a range between 0.05 and 0.2 μm. Further, as another examples of the reflecting film, it is possible to coat the surface of the scintillation fiber with a light diffusing white pigment such as $TiO_2$ or a white coating film containing thereof and a white reflecting coating film containing micro bubbles, for example, to a film thickness of a range between 5 and 30 μm. The reflecting film may be made of any material or may be formed into any thickness in so far as the reflecting film does not allow entrance of ultraviolet rays that activate the phosphor dissolved in the scintillation fiber and the core. In a case where a plurality of scintillation fibers is accommodated in the protective tube, it is preferable that each one of the plurality of scintillation fibers includes the light entry preventing element.

A second invention is directed to a radiation measurement apparatus. The radiation measurement apparatus includes the cable. Preferably, the radiation measurement apparatus of the present invention is an apparatus using a Time of Flight method (see, for example, Patent Literatures 1 and 2). The present apparatus is suitable for the use of a portable type radiation measurement apparatus that is always exposed to the vibration while moving. The portable type radiation measurement apparatus is, preferably, loaded on vehicles and the like to be used for the purpose of measurement under a moving environment. In a case where the cable to be used in the radiation measurement apparatus has a length equal to or more than three meters, the cable preferably has an allowable minimum bending diameter equal to or less than 500 mm in order to allow the cable to be bended for accommodation thereof in the apparatus. Preferably, the scintillation fiber to be used for the cable is the PSF.

Hereinafter, the present invention will be described in detail according to specific embodiments. However, the present invention is not limited only to the below mentioned embodiments. Needless to say, the present invention is applicable to a plurality of cases at the same time without departing from the spirit and essential characteristics of the present invention. Further, needless to say, all the variations and modifications falling within the equivalency range of the description herein are intended to be embraced in the present invention.

For example, the following cables are also encompassed within the present invention. That is, encompassed are a cable having such a configuration that the flexible stainless pipe covered by the black plastic is used as the protective tube for the purpose of retaining flexibility as well as obtaining toughness of the cable; a cable having such a configuration that an inner protective tube is provided inside the outside protective tube to form a cable having a double wall structure; a cable having such a configuration that the outside of the scintillation fiber is preliminary protected by a fabric-like flexible material and, subsequently, the protected scintillation fiber is inserted into the protective tube; and a cable having such a configuration that a reinforcing material (tension member) is added to the inside of the protective tube in order to defend against the tensile stress of the cable.

FIG. 1 is a cross sectional view of a cable according to a first embodiment of the present invention. The cable is a cable to be used for a radiation measurement apparatus.

In FIG. 1, 21 denotes a protective tube. The protective tube 21 is made of, for example, a black polyolefin-based resin that contains carbon. The protective tube 21 has a cylindrical body of which outer diameter is 9.5 mm and of which inner diameter is 7.0 mm.

22 denotes a PSF. In the PSF 22, a core 22a thereof is made of a polystyrene resin, and a clad 22b thereof is made of a polymethyl methacrylate resin. The PSF 22 has an outer diameter of 1.5 mm. The PSF 22 is accommodated in the protective tube 21. The PSF 22 is simply accommodated in the protective tube 21 and is not restricted by anything. In the present embodiment, there are four PSFs 22. The PSFs 22 are not bound together. In other words, the PSFs 22 are free from one another.

A surface of the PSF 22 is coated with a silicone oil. The surface of the PSF 22 is provided with a silicone oil film 23. The silicone oil film 23 ensures smooth sliding. Therefore, even when friction is produced between the PSF 22 and the PSF 22 or between the PSF 22 and the protective tube 21, the static electricity is hardly generated.

Figure 2:
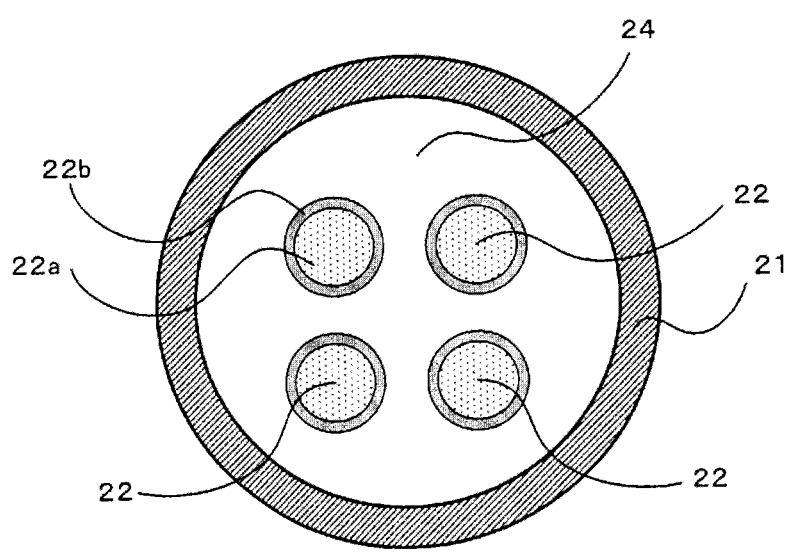
FIG. 2 is a cross sectional view of a cable according to a second embodiment of the present invention.

FIG. 2 is a cross sectional view of a cable according to a second embodiment of the present invention. The cable is a cable to be used for the radiation measurement apparatus.

In the first embodiment, the surface of the PSF 22 was provided with the silicone oil film 23. In the second embodiment, the protective tube 21 filled with a silicone oil 24 is exemplified. A state that the protective tube 21 is filled with the silicone oil 24 is equivalent to a state that a silicone oil film is provided on the surface of the PSF 22.

Other configurations are identical to those of the above described embodiment. It is noted that like reference numerals designate corresponding or identical elements throughout the present specification.

Figure 3:
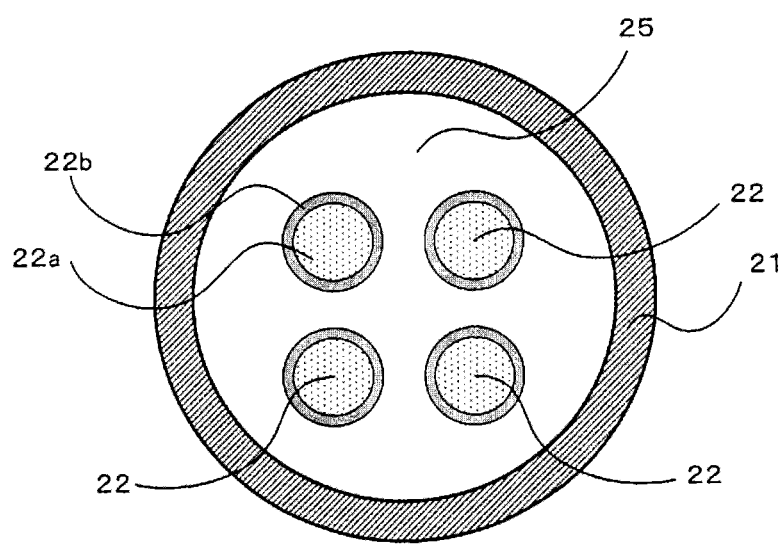
FIG. 3 is a cross sectional view of a cable according to a third embodiment of the present invention.

FIG. 3 is a cross sectional view of a cable according to a third embodiment of the present invention. The cable is a cable to be used for the radiation measurement apparatus.

In the second embodiment, the protective tube 21 was filled with the silicone oil 24. In the present embodiment, the protective tube 21 filled with an electrolyte composition (ionic surfactant such as sodium dodecyl sulfate and the like of a range between 0.1 and 0.5 wt %) containing water 25, instead of the silicone oil, is exemplified.

Other configurations are identical to those of the above described embodiments. It is noted that like reference numerals designate corresponding or identical elements throughout the present embodiment.

Figure 4:
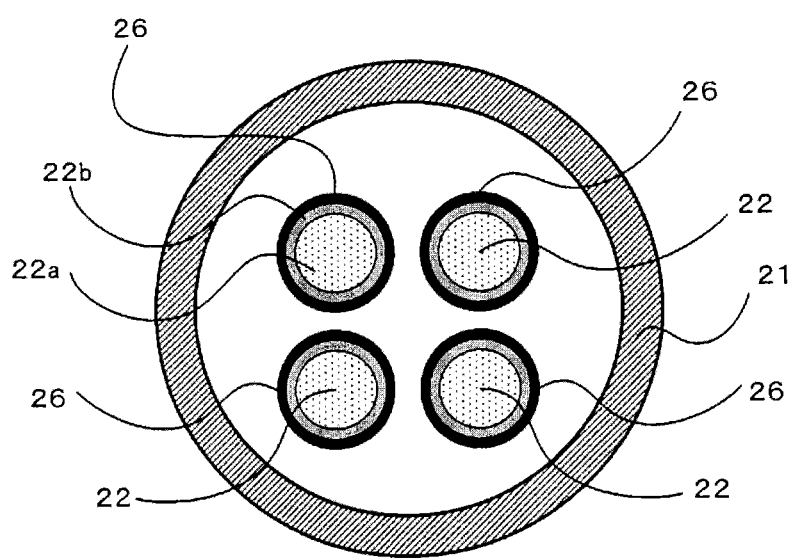
FIG. 4 is a cross sectional view of a cable according to a fourth embodiment of the present invention.

FIG. 4 is a cross sectional view of a cable according to a fourth embodiment of the present invention. The cable is a cable to be used for the radiation measurement apparatus.

In the first embodiment, the surface of the PSF 22 is provided with the silicone oil film 23. In the present embodiment, the PSF 22 provided with a conductive coating film (carbon nanotube-containing coating film) 26 on its surface is exemplified. The conductive coating film was provided by coating of a conductive coating (carbon nanotube-containing coating) material.

Other configurations are identical to those of the above described embodiments. It is noted that like reference numerals designate corresponding or identical elements throughout the present specification.

Figure 5:
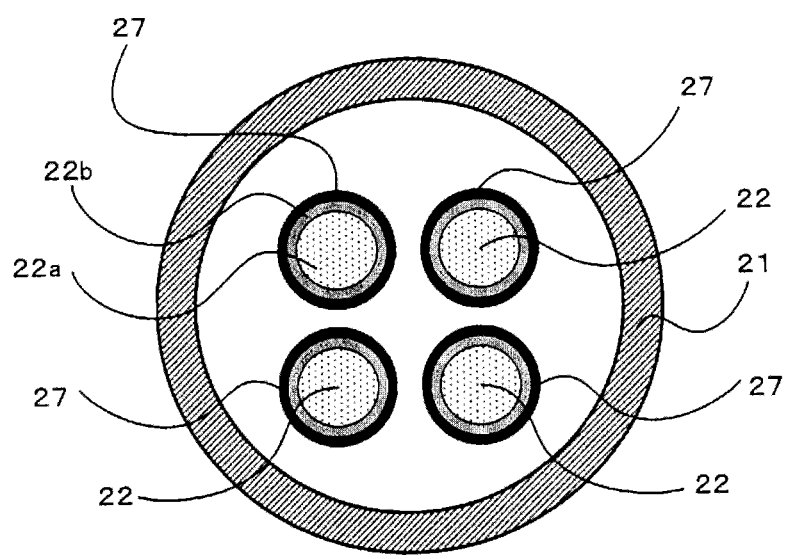
FIG. 5 is a cross sectional view of a cable according to a fifth embodiment of the present invention.

FIG. 5 is a cross sectional view of a cable according to a fifth embodiment of the present invention. The cable is a cable to be used for the radiation measurement apparatus.

In the fourth embodiment, the surface of the PSF 22 is provided with the carbon nanotube-containing coating film 26. In the fifth embodiment, the PSF 22 provided with a carbon black-containing coating film (black film) 27 on its surface is exemplified. The carbon black-containing coating film 27 is provided by coating of the carbon black-containing coating material.

Other configurations are identical to those of the above described embodiments. It is noted that like reference numerals designate corresponding or identical elements throughout the present specification.

A configuration with the reflecting film (e.g., metal film and white coating film) is identical to the configuration of FIG. 5. In other words, the carbon black-containing coating film (black film) 27 of FIG. 5 was replaced by a reflecting film here. Therefore, illustration thereof is omitted here.

Figure 6:
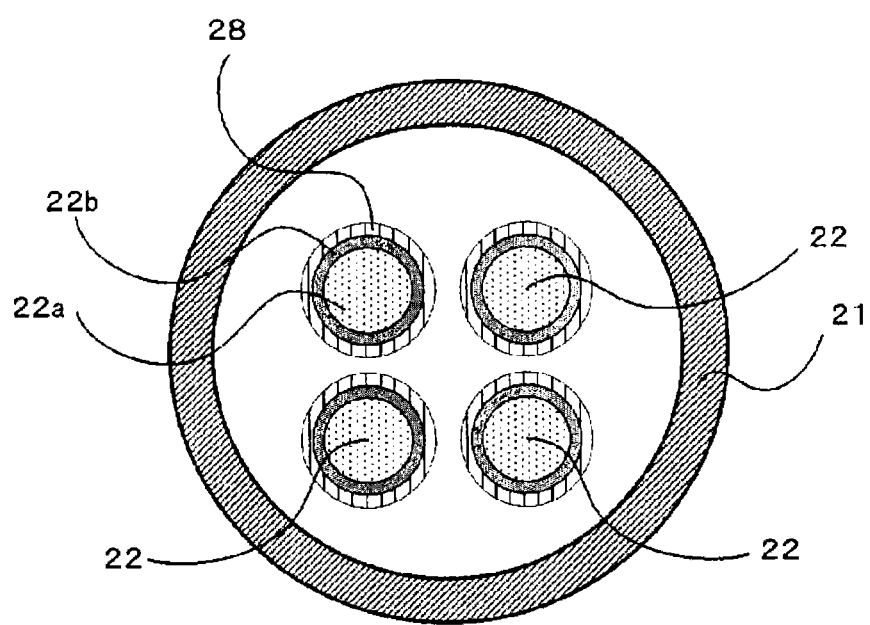
FIG. 6 is a cross sectional view of a cable according to a sixth embodiment of the present invention.

FIG. 6 is a cross sectional view of a cable according to a sixth embodiment of the present invention. The cable is a cable to be used for the radiation measurement apparatus.

In the present embodiment, exemplified is a configuration in which the surface of the clad 22b of the surface of the PSF 22 is provided with a polyethylene covering 28, and an inner surface of the protective tube 21 is made of polyethylene. In order to form the inner surface of the protective tube 21 with polyethylene, (1) the protective tube itself is to be made of polyethylene, or (2) not-shown polyethylene covering is to be additionally provided to the inner surface of the protective tube.

Figure 7:
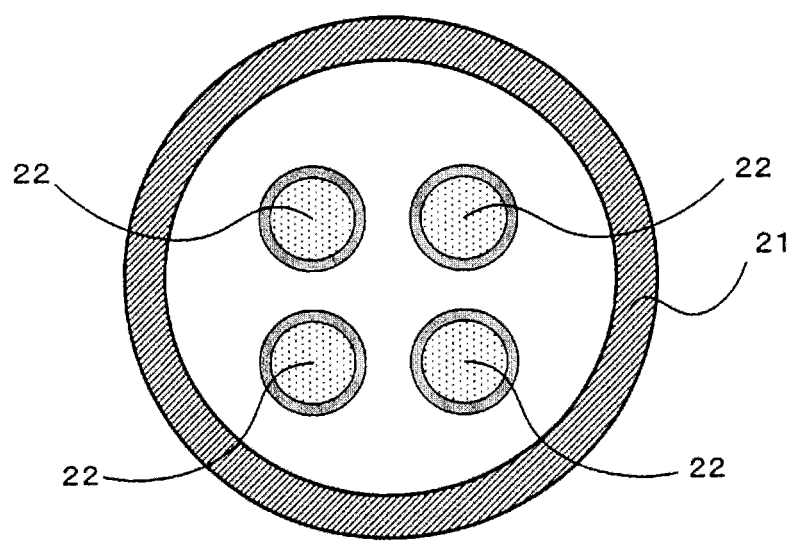
FIG. 7 is a cross sectional view of a cable according to a reference example.
Figure 8:
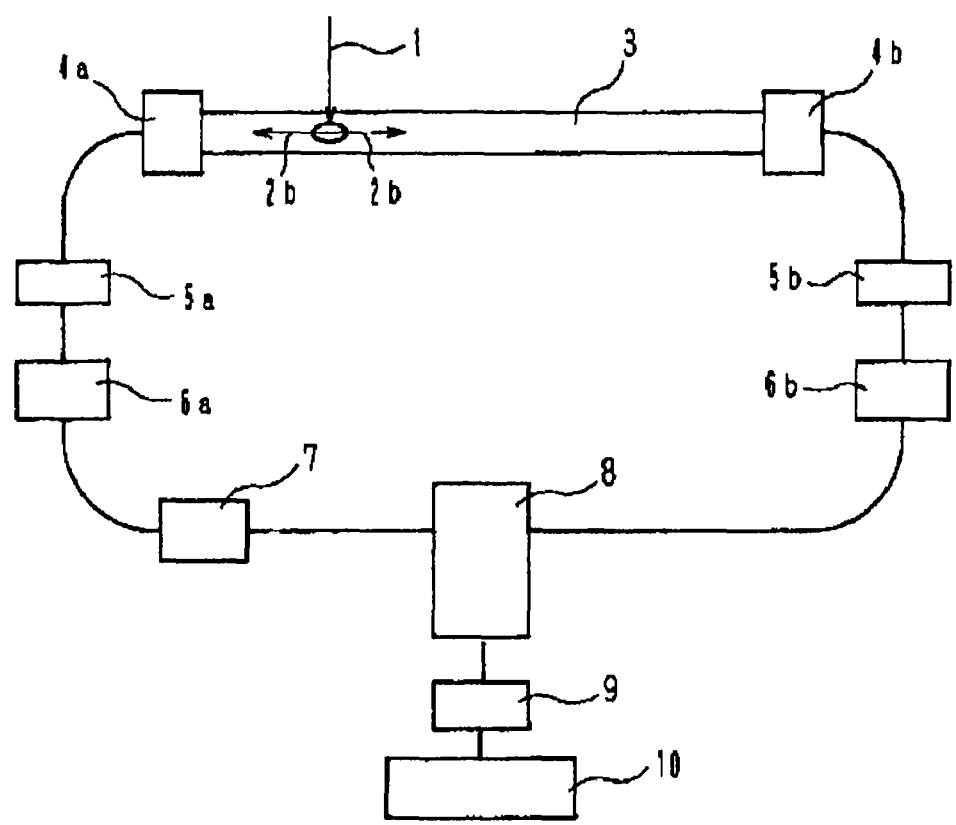
FIG. 8 is a schematic drawing of a radiation detector.
Figure 9:
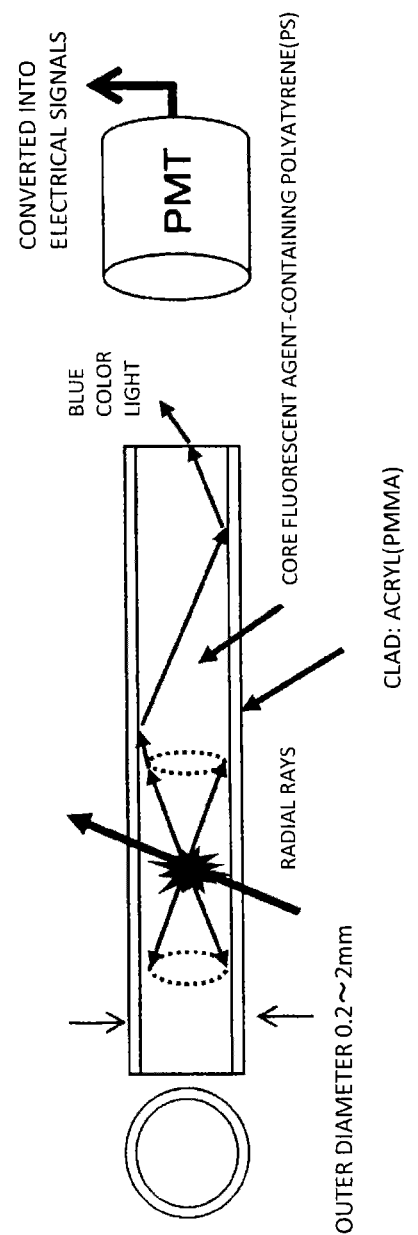
FIG. 9 is a schematic drawing illustrating a luminescence principle of irradiation of radial rays.
Figure 10:
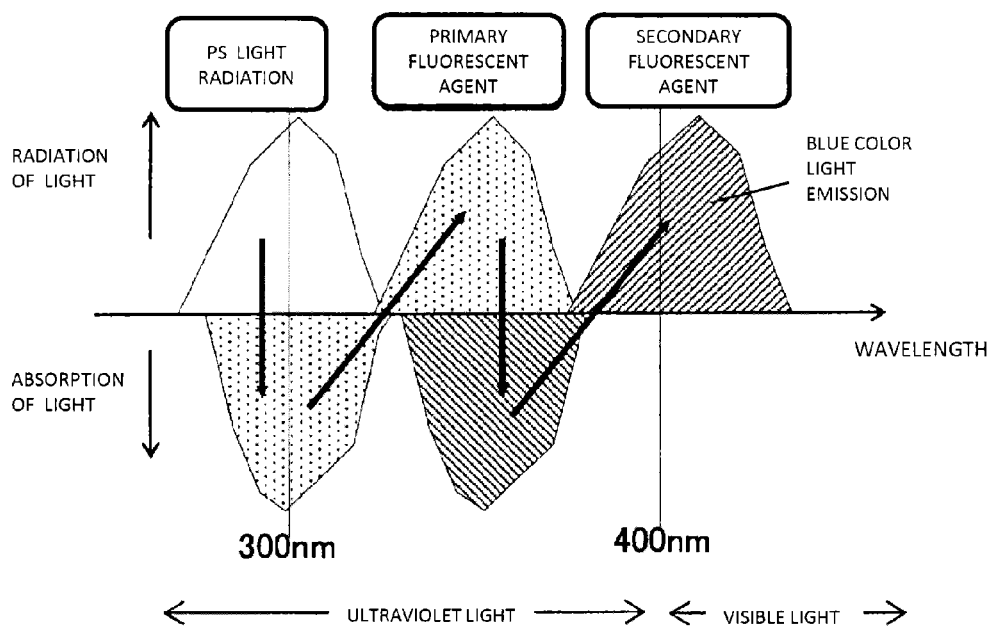
FIG. 10 is a schematic drawing illustrating a state of conversion from ultraviolet radiation to blue color light within a core.

FIG. 7 is a cross sectional view of a cable as a reference example. The cable is a cable to be used for the radiation measurement apparatus.

In the cable according to the first embodiment, the surface of the PSF 22 was provided with the silicone oil film 23. To the contrary, in the present reference example, a cable that is not provided with a silicone oil film is exemplified.

The other configurations are identical to those of the first embodiment. It is noted that like reference numerals designate corresponding or identical elements throughout the present specification.

Figure 11:
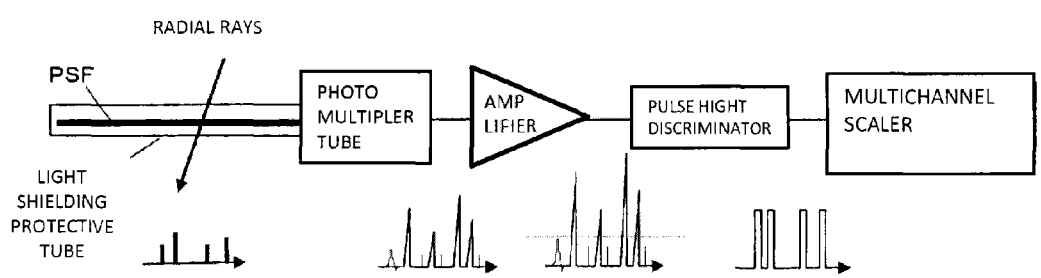
FIG. 11 is a schematic drawing of a radiation detection assembly using a PSF.

The cable of each of the above described embodiments was assembled in a radiation measurement apparatus illustrated in FIG. 11. The cable has a length of three meters. A button shaped standard type γ-rays$^{137}$Sc was brought closer to all the cables assembled in the radiation measurement apparatus at a position two meters away from a side of the light receiving element (one meter away from another side) of the PSF cable. This confirmed certain radiation measurement sensitivity. Vibration noise thereof was checked. A result thereof is shown in Table-1. The PSF cable is fixed to a vibration portion of a vibrator (masseur, the number of vibrations of a range between 2500 and 3000 vibrations/min.) at the position two meters away from the light receiving element of the PSF cable to be exposed to the vibration. In the conventional cable (cable of the reference example shown in Table-1), remarkable quasi signal noise was counted by this exposure to vibration.

TABLE 1

|  | noise generation level |
|---|---|
| cable of first embodiment | little |
| cable of second embodiment | little |
| cable of third embodiment | little |
| cable of fourth embodiment | little |
| cable of fifth embodiment | little |
| cable of sixth embodiment | sharply dropped |
| cable of reference example | generation of remarkable quasi signal noise |

As seen from Table-1, use of cables according to the above described embodiments reduces noise caused by vibration and the like and ensures high detection accuracy for detecting radial rays. Specifically, stable measurement is achieved with a measuring instrument to be used, while moving, inside or outside and a portable type measuring instrument to be used in moving. A measurement system capable of achieving high measurement accuracy and having high reliability could be obtained. In thus obtained measurement system, static electricity is hardly charged (generated). This ensures a good handling ability.

REFERENCE SIGNS LIST 21 protective tube
22 PSF
22a core
22b clad
23 silicone oil film
24 silicone oil
25 electrolyte composition-containing water
26 carbon nanotube-containing coating film
27 carbon black-containing coating film
28 polyethylene covering

The invention claimed is:

1. A cable comprising:
   a protective tube;
   a scintillation fiber accommodated in the protective tube; and
   oil accommodated in the protective tube,
   wherein the oil is provided in the form of a film on a surface of the scintillation fiber, the kinetic viscosity of the oil is 30-3000 mm$^2$/s, and the thickness of the oil film on the surface of the scintillation fiber is 0.1-300 nm.

2. The cable according to claim 1, wherein the scintillation fiber accommodated in the protective tube is a plastic scintillation fiber.

3. The cable according to claim 1, wherein the oil prevents electrical charge from locally existing in the scintillation fiber.

4. The cable according to claim 1, comprising two or more scintillation fibers accommodated in the protective tube, wherein said oil is provided in the form of a film on a surface of each scintillation fiber.

5. A radiation measurement apparatus comprising the cable according to claim 1.

6. The cable according to claim 1, wherein a material constituting an inner surface of the protective tube and a material constituting an outer surface of the scintillation fiber are materials of the same kind.

7. The cable according to claim 1, wherein said oil is a silicone oil.

8. The cable according to claim 1, wherein said oil is a fluorine-based oil.

9. The cable according to claim 1, wherein said oil is selected from dimethylpolysiloxane oil, methylphenyl silicone oil, ester-modified methylhydrogensilicone oil, fluorine-modified methylhydrogensilicone oil, chlorosilane-based oils, alkoxysilane-based oils, and chlorotrifluoroethylene.

10. The cable according to claim 1, wherein the kinetic viscosity of the oil is 200-500 mm$^2$/s, and the thickness of the oil film on the surface of the scintillation fiber is 0.3-10 nm.

11. The cable according to claim 4, wherein said oil is a silicone oil.

12. The cable according to claim 4, wherein said oil is a fluorine-based oil.

13. The cable according to claim 4, wherein said oil is selected from dimethylpolysiloxane oil, methylphenyl silicone oil, ester-modified methylhydrogensilicone oil, fluorine-modified methylhydrogensilicone oil, chlorosilane-based oils, alkoxysilane-based oils, and chlorotrifluoroethylene.

14. The cable according to claim 4, wherein the oil is provided in the form of a film on surfaces of the two or more scintillation fibers, the kinetic viscosity of the oil is 200-500 mm$^2$/s, and the thickness of the oil film on the surfaces of the scintillation fibers is 0.3-10 nm.

* * * * *